Aug. 7, 1962     H. E. KOERNER ET AL     3,048,700

X-RAY SHUTTER APPARATUS

Filed Sept. 24, 1959     3 Sheets-Sheet 1

INVENTORS
Harry E. Koerner &
Everett W. Vaughn
BY
ATTORNEY

Aug. 7, 1962 H. E. KOERNER ET AL 3,048,700
X-RAY SHUTTER APPARATUS

Filed Sept. 24, 1959 3 Sheets-Sheet 3

United States Patent Office 3,048,700
Patented Aug. 7, 1962

3,048,700
X-RAY SHUTTER APPARATUS
Harry E. Koerner, Catonsville, and Everett W. Vaughn, Ellicott City, Md., assignors to Westinghouse Electric Corporation, East Pittsburgh, Pa., a corporation of Pennsylvania
Filed Sept. 24, 1959, Ser. No. 842,003
7 Claims. (Cl. 250—105)

The present invention relates to X-ray apparatus and more particularly to X-ray shutter apparatus.

For the convenience of radiologists, there is provided on X-ray screen frames and spot film devices a means for controlling the shutters which are adjustable bidirectionally to control the mutually-transverse dimensions of an X-ray beam-defining aperture. Since the beam must be confined in two directions, two pairs of shutters are provided, each being controlled separately from the other. In the past, the means employed for controlling the shutters consisted of a pair of levers or knobs to separately control the shutter pairs. Since, during the usual fluoroscopic examination, the operator or radiologist wore leaded gloves, the manipulation of such dual controls is often difficult and, at best, awkward.

In view of the foregoing remarks, it becomes a prime object of the present invention to provide an improved X-ray shutter apparatus of the aforementioned type which overcomes the above objections.

It becomes another object of the invention to provide an improved X-ray shutter apparatus which is adjustable bidirectionally by manipulation of only a single operator's control member.

It is still another object of the present invention to provide an X-ray shutter apparatus having means for indicating to an operator the size and shape of the X-ray beam-defining aperture produced by such apparatus.

Other objects and advantages of the invention will become apparent from the following description of the invention when taken in connection with the accompanying drawings, in which.

Figure 1:
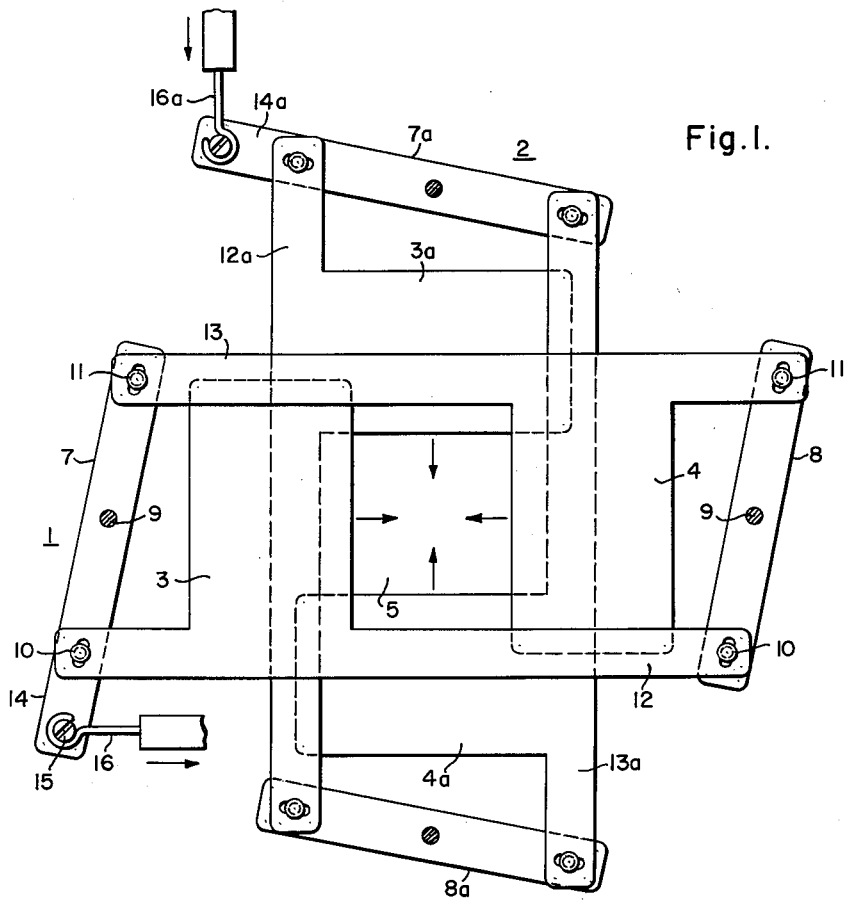
FIG. 1 is a schematic representation of a well-known form of X-ray shutter assemblage which may be employed in the present invention.

Referring to FIG. 1, the bidirectionally adjustable shutter means which may be employed in the present invention may take the well-known form as including two pairs of shutters which overlap and extend in mutually-transverse directions. Each of the pairs 1 and 2 may include the usual oppositely-movable shutters 3 and 4 of substantially plate-like form and of X-ray opaque material, to define the opposite edges of an X-ray beam defining aperture 5. Movement of shutters 3 and 4 toward and away one from the other may be effected in the usual manner by rocking movement of spaced apart-levers 7 and 8 at opposite ends of the shutters; each of levers 7 and 8 being rockable about respective fixed pivots 9 and operatively connected to shutters 3 and 4 through the medium of such as sliding pin joints 10 and 11, respectively, for example, and rigid members 12 and 13, respectively. One of the levers, lever 7, for example, is adapted, as by an extension 14 and connector 15 to be actuably connected to an operating agent such as a Bowden wire 16.

The parts of the mutually transverse pair 2 of shutters, being identical to the pair 1, bear like reference numerals, distinguished, for sake of clarity, by the subscript "a."

It will be apparent that actuation of one pair of shutters will affect such as the width dimension of the X-ray beam-defining aperture 5, while actuation of the transverse pair of shutters will affect the opposite or height dimension of such aperture.

Figure 2:
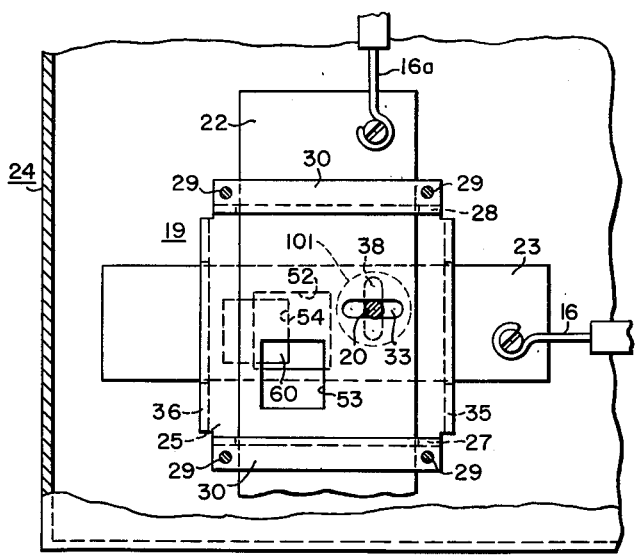
FIGS. 2 and 3 are top and end views, respectively, of a novel control mechanism for employment in conjunction with such as the X-ray shutters of FIG. 1, in accord with the present invention.
Figure 3:
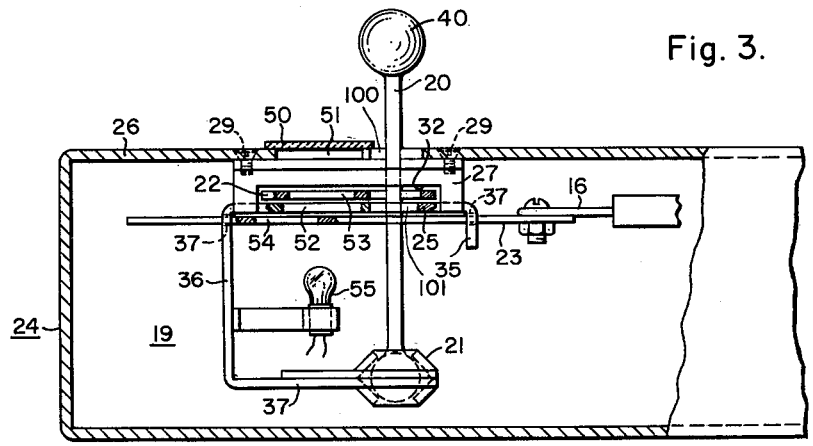

Referring to FIGS. 2 and 3 in accord with a feature of the invention, the shutter apparatus utilizes a control mechanism operable by a single control member in form of a lever 20 which is movable manually in any direction about a pivot point defined by ball-and-socket joint 21 at its one end to cause movement of a pair of slidable members 22 and 23 in mutually transverse directions in accordance with movement of such lever, for causing bidirectional adjustment of the shutter means through the medium of connecting means in the form of a pair of Bowden wires, for example, extending between the slider members 22 and 23 and connecting portions 14, 14a of lever 7, 7a of shutter pairs 1 and 2, respectively.

Control mechanism 19 is adapted to be mounted in such as the housing 24 of a spot film device, for example, and includes a fixed mounting and guide plate member 25 for disposition within the housing 24 and attachment to a top panel member 26 thereof through the medium of a pair of normally-extending, rigidly-connected, spaced-apart support and guide elements 27 and 28 removably secured to the underside of the top panel member 26 by such as machine screws 29 through the medium of respective flange members 30 attached to the upper end of such support and guide elements. The support and guide elements 27 and 28 are provided with respective aligned through openings 32 for slidable guiding support of slider member 22 which extends therethrough. An elongated opening 33 extending transversely of slider member 22 is provided to accommodate extension of the operator's control lever 20 therethrough.

Bridging the support and guide elements 27, 28 and extending downwardly therefrom, the mounting and guide plate member 25 is provided with a pair of parallel, spaced-apart support and guide elements 35 and 36 having respective aligned openings 37 for slidable support and guiding of slider member 23 which extends therethrough in a direction perpendicular to the direction of extension of slider member 22. In addition, the downwardly extending support and guide element 36 includes an integrally-formed right angle portion 37 to which is attached the socket portion of the ball and socket joint 21 associated with the lowermost end of the operator's control lever 20. Slider member 23 is provided with an elongated opening 38 extending transversely thereof which intersects the opening 33 in slider member 22 and serves to accommodate extension of the operator's control lever 20 therethrough.

Referring to FIGS. 1, 2 and 3, in operation of the shutter apparatus, by manipulation of the handle 40 attached to lever 20 and disposed above the top panel member 26, such lever 20 may be rocked about the ball and socket joint 21 within the housing 24 from left to right as viewed in FIG. 2, for example, to cause slider member 23 to move correspondingly by contact of such lever with the side walls of elongated opening 28. Lever 20 also may be moved forward and backward to cause the slider member 22 to move correspondingly through contact of such lever with the side-walls of the elongated opening 33. It will be appreciated that such bidirectional movement may be effected simultaneously by angulated movement of the operator's control lever 20. The movement of slider members 22 and 23 will effect corresponding movements of the connecting elements in the form of Bowden wires 16, 16a, or other connecting means, to in turn cause the respective bidirectional adjustment of the pairs 1 and 2 of such as the shutter means shown in FIG. 1. It will be apparent that, in accord with a prime object of the invention, such bidirectional adjustment of the shutter means is greatly facilitated by the single lever control which may be manipulated with relative ease even while the operator may be using relatively thick, heavily shielded gloves.

Figure 4:
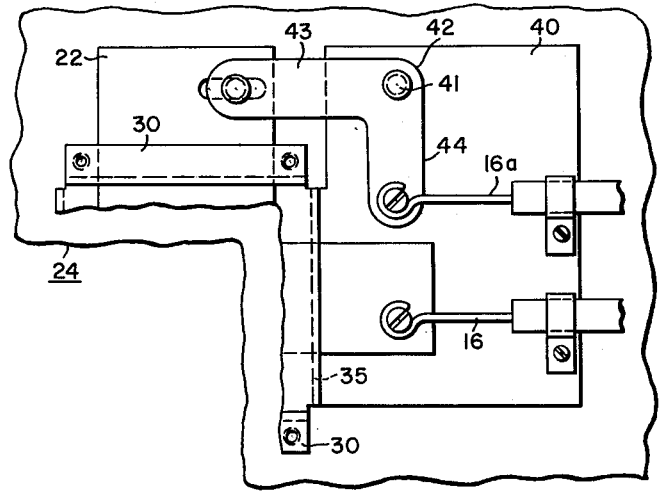
FIG. 4 is a plan view of a modified portion of the control mechanism shown in FIGS. 2 and 3.

While, on behalf of facilitating connection of such as the Bowden wire 16, 16a, to the operating levers 14, 14a of the shutter mechanism, it becomes desirable that such wires leave the mechanism 19 adjacent to or parallel to one another, rather than perpendicular to one another as in FIG. 2, such mechanism may be modified as shown in FIG. 4, for example. As so modified, the downwardly extending support and guide element 35 may be provided with an attached portion 40 extending outwardly therefrom in the direction of wire 16 parallel to the top panel member 26. Such portion 40 may then serve as a rigid mount for a fixed pivot element 41 to act as a pivot point at the knee of a bell crank lever 42 properly connected at the end of one of its arms 43 to the slider member 22 and at the end of its other arm 44 to the wire 16a. It will thus be seen that backward and forward motion of the slider member 22 will cause movement of the Bowden wire 16a in the direction parallel to movement of the Bowden wire 16 due to rocking movement of the bell crank lever 42.

Referring again to FIGS. 2 and 3, in accord with additional features of the invention, means are provided for indicating to the operator the size and shape of the X-ray beam-defining aperture 5 formed by the shutter means. Such means may take the form as shown in FIGS. 2 and 3 in which is provided a translucent screen 50, of glass or plastic, for example, having a ground surface thereon covering an opening 51 in the top panel member 26 of the housing 24. Opening 51 is in registry with an opening 52 in the support and guide member 25. Opening 51 is of any suitable shape and is made of a size equal to or slightly greater than equal-sized square openings 53 and 54 in slider members 22 and 23, respectively. A lamp 55, disposed within the housing 24 in alignment with openings 51 and 52, is provided. Openings 53 and 54 in slider members 22 and 23 are arranged such that same will coincide and lie within the projected confines of openings 51 and 52 when such slider members are positioned to correspond to the fully opened positions of pairs 1 and 2 of the shutter mechanism. In other positions of the handle of the control lever 20 and of the slider members 22 and 23, openings 53 and 54 will variously overlap to form a light aperture 60 for the lamp 55 which corresponds in size and shape to the size and shape of the X-ray beam-defining aperture 5 formed by the shutter mechanism. The shape and size of such light aperture 60 is duplicated as a light image on the translucent screen 50 which may be observed by the operator to direct his control of the shutter mechanism.

Figure 5:
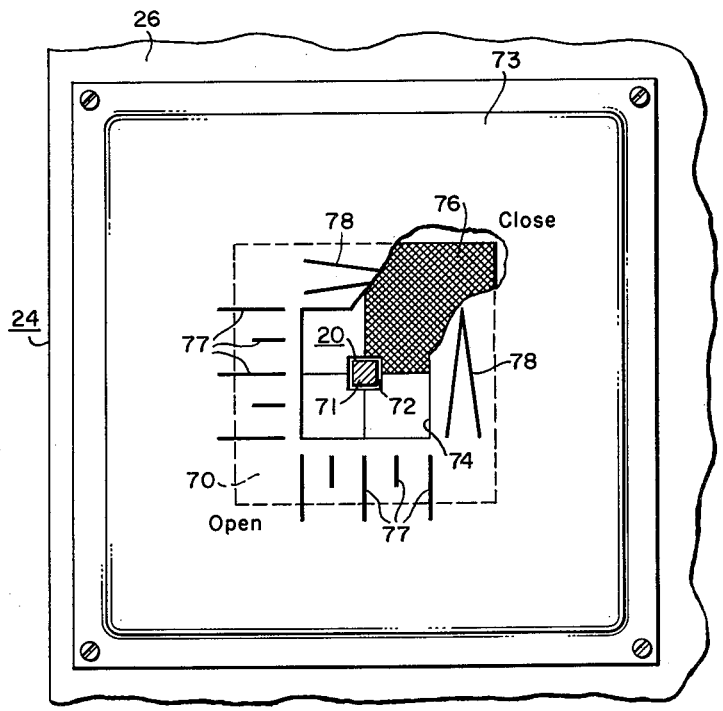
FIGS. 5 and 6 are top and sectional side views, respectively, of an alternate X-ray aperture-indicating means.
Figure 6:
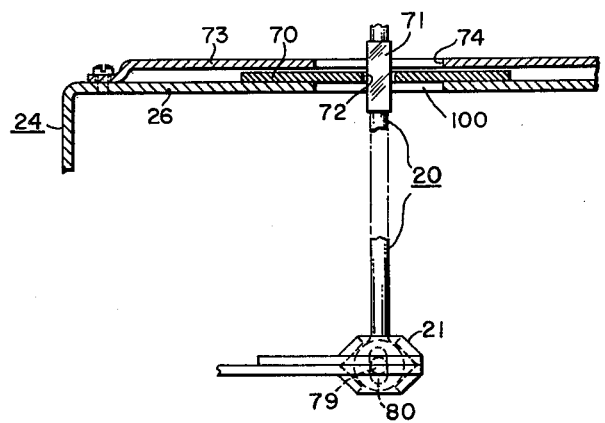

Referring to FIGS. 5 and 6, an alternate arrangement for indicating to the operator or radiologist the size and shape of the X-ray aperture 5 defined by the X-ray shutter means, may be employed in lieu of the arrangement of FIGS. 2 and 3. Such alternate arrangement comprises an indicator plate element 70 which is arranged to be moved by the operator's control lever 20 for assuming positions corresponding to the different positions of such control lever and hence corresponding to the size and shape of the X-ray beam-defining aperture 5. This movement may be effected through motion linking means where it is preferred that the control lever 20 be located remotely of the indicator means, but, for sake of illustration, this is accomplished in the showing of FIGS. 5 and 6 by the extending of a square cross-section portion 71 of lever 20 through a square opening 72. In rocking of lever 20 to effect adjustment of the X-ray shutter means as aforedescribed, contact of lever portion 71 with the side walls of opening 72 will cause indicator plate 70 to move correspondingly. When installed in association with a spot-film device, the indicator plate may be slidably supported and guided by a surface of the top panel member 26, and by a flat surface of a retaining plate member 73 suitably secured around its periphery to such top panel member 26. Where such indicator plate 70 is operated directly by the operator's control lever 20, as shown in FIGS. 5 and 6, the retaining plate member 73 and indicator plate element 70 will be located on the upper surface of the panel members 26 in order to avoid conflict with the shutter actuating mechanism of FIGS. 2 and 3, where, however, indicator plate 70 is to be actuated indirectly by lever 20 through the medium of suitable linkage as an element corresponding to lever 20 passing through plate element 70, the retaining plate member might easily be located beneath the top panel member 26.

In the embodiment illustrated in FIGS. 5 and 6, position of the indicator plate element 70 is utilized to indicate the size and shape of the X-ray beam-defining aperture 5 (FIG. 1), by the provision of an opening 74 in the retaining plate member 73, which is of a size and shape corresponding to the maximum size and shape of aperture 5, and compatible with maximum movement of lever 20 in its prescribed directions. A quarter section 76 of the indicator plate element 70 is distinguished, as by marking or coloring, from the remaining sections and so located with respect to correlation of lever 20 movement and X-ray shutter response that the size and shape of the distinguished section 76 appearing within the opening 74 in retaining plate member 73 corresponds to the size and shape of the X-ray beam-defining aperture 5 (FIG. 1). As an assist in determining relative adjusted sizes of aperture 5, such as ½, ¼, ¾ etc., with respect to both width and height of such aperture, markings 77 are provided on the upper face of plate member 73 along opposite edges of opening 74. By alignment of the edges of distinguished portion 76 with the markings 77, a selected X-ray aperture size and shape may be obtained. As a further aid in shutter control, legends "Open" or "o" and "Close" or "c," may be placed on plate member 73 to indicate the direction of lever 20 movement responsible for the corresponding adjustment of the X-ray aperture. Additionally, V-shaped symbols 78 may be placed along opposite sides of opening 74 to indicate symbolically the direction of lever 20 movement responsible for moving the X-ray shutter closer together or farther apart.

The cooperative relationship between square section 71 of lever 20 and the walls of square opening 72 assures that indicator plate 70 does not turn about the longitudinal axis of such lever. To assure that both the lever 20 and the plate 70 do not turn in unison about such axis, the ball-and-socket joint 21 may be modified to include a pin 79 extending through the ball and into respective grooves 80 in the socket at opposite ends of the pin. Such arrangement does not prevent the desired multi-directional rocking movement of lever 20.

As shown in FIG. 6, the top panel member 26 is provided with an opening 100 through which the operator's lever 20 extends. Obviously such opening 100 must be of sufficient size to permit the necessary freedom for the aforedescribed bi-directional rocking movement of such lever about ball-and-socket joint 21. A similar opening 101, FIGS. 2 and 3, is also provided in plate member 25.

While the invention has been described with some degree of particularity, it will be apparent to those skilled in the art that various modifications and changes may be made without departing from the spirit and scope of such invention as defined by the appended claims.

We claim as our invention:

1. In X-ray apparatus, the combination of X-ray shutter means adjustable bidirectionally to control the mutually-transverse dimensions of an X-ray beam-defining aperture, an operator's control member mounted for movement with multi-directional freedom, and means operatively connecting said control member to said shutter means for selectively adjusting one or the other of said transverse dimensions according to the direction of movement of said control member.

2. In X-ray apparatus, the combination of two pairs of oppositely-movable X-ray shutters for adjusting the mutually-transverse dimensions, respectively, of an X-ray beam-defining aperture, an operator's control member mounted for movement with multi-directional freedom, first means operatively connecting said control member to one pair of said X-ray shutters for adjusting same according to movement of said control member in one direction, and second means operatively connecting said control member to the other pair of said X-ray shutters for adjusting same according to movement of said control member in a transverse direction.

3. In X-ray apparatus, the combination of two pairs of oppositely-movable X-ray shutters for adjusting the mutually-transverse dimensions, respectively, of an X-ray beam-defining aperture, an operator's control member mounted for movement with multi-directional freedom, first means operatively connecting said control member to one pair of said X-ray shutters for adjusting same according to movement of said control member in one direction, second means operatively connecting said control member to the other pair of said X-ray shutters for adjusting same according to movement of said control member in a transverse direction, and visual means controlled by said control member for indicating the shape and size of said X-ray beam-defining aperture.

4. In X-ray apparatus, the combination of concealed X-ray shutter means adjustable to define the mutually-transverse dimensions of an X-ray beam-defining aperture, an operator's control member operatively connected to said X-ray shutter means, and adjustable aperture-dimension indicator means operably connected to said control member means for adjustment in correspondence with adjustment of said X-ray shutter means.

5. In X-ray apparatus, the combination of X-ray shutter means adjustable bidirectionally to control the mutually-transverse dimensions of an X-ray beam-defining aperture; an operator's control lever pivotally mounted for rockable movement with multi-directional freedom; a pair of slidable members mounted for movement exclusively in mutually-transverse directions, respectively, said members having overlapping mutually-transverse elongated openings, respectively, through which said control lever extends for slidable contact with the longitudinal side walls of such openings, the elongated openings in each of said members extending in a direction perpendicular to the direction of movement of such member; and means operatively connecting said members to said shutter means for bidirectional adjustment thereof, respectively.

6. X-ray shutter apparatus comprising X-ray shutter means adjustable bidirectionally to control the transverse dimensions of a rectangular X-ray beam-defining aperture, an operator's control lever and a pair of overlapping, transversely-movable plate-like members operably connected to said lever and operatively connected to said X-ray shutter means for respective directional adjustment of same, said plate-like members having rectangular openings therein arranged to overlap according to the shape and size of said X-ray beam-defining aperture to form a corresponding light aperture, a light screen disposed at one side of said light aperture to picture in silhouette the shape and size of said light aperture, and lamp means to transmit light through said light aperture onto said screen.

7. In an X-ray apparatus having adjustable shutter means defining the shape and size of mutually-transverse dimensions of a rectangular or square X-ray beam-defining aperture, the combination of a plate-like indicator element movable in right-angled directions corresponding to the mutually-transverse dimensions of the X-ray beam-defining aperture and means defining a right-angled framing opening behind which said indicator element moves, said indicator element having a marking thereon for appearance within said framing opening according to the size and shape of said X-ray beam-defining aperture.

References Cited in the file of this patent

UNITED STATES PATENTS

| | | |
|---|---|---|
| 1,250,730 | Waite | Dec. 18, 1917 |
| 1,623,567 | Wappler | Apr. 5, 1927 |
| 1,767,756 | Hall | June 24, 1930 |
| 2,474,422 | Hollstein | June 28, 1949 |
| 2,492,031 | Blatz | Dec. 20, 1949 |
| 2,784,320 | Scholtz | Mar. 5, 1957 |

FOREIGN PATENTS

| | | |
|---|---|---|
| 706,378 | Great Britain | Mar. 31, 1954 |